(12) United States Patent
Tan et al.

(10) Patent No.: US 8,674,057 B1
(45) Date of Patent: Mar. 18, 2014

(54) AROMATIC POLYIMIDES, POLYAMIDES AND POLY(AMIDE-IMIDE) CONTAINING DIARYLAMINOFLUORENE-BENZOTHIAZOLE MOIETIES AS TWO-PHOTON ACTIVE UNITS

(75) Inventors: Loon-Seng Tan, Centerville, OH (US); Matthew J. Dalton, Bellbrook, OH (US); Ramamurthi Kannan, Cincinnati, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 143 days.

(21) Appl. No.: 13/032,719

(22) Filed: Feb. 23, 2011

Related U.S. Application Data

(60) Provisional application No. 61/307,033, filed on Feb. 23, 2010.

(51) Int. Cl.
  *C08G 73/10* (2006.01)
(52) U.S. Cl.
  USPC ........................................................ 528/353
(58) Field of Classification Search
  USPC ........................................................ 528/353
  See application file for complete search history.

(56) References Cited

U.S. PATENT DOCUMENTS

| | | |
|---|---|---|
| 6,300,502 B1 | 10/2001 | Kannan et al. |
| 6,555,682 B1 | 4/2003 | Kannan et al. |
| 6,730,793 B1 | 5/2004 | Kannan et al. |
| 6,867,304 B1 | 3/2005 | Tan et al. |
| 7,067,674 B1 | 6/2006 | Kannan et al. |
| 7,319,151 B1 | 1/2008 | Tan et al. |

OTHER PUBLICATIONS

Dalton et al ("Synthesis and Characterization of Novel Aromatic Imide Polymer and Co-polymers containing Diphenylaminofluorene-Benzothiazole as Two-Photon Chromophoric Units." Polymer Preprints (American Chemical Society, Division of Polymer Chemistry), (Mar. 22-26, 2009), 50(1), 495-496.).*
Bell et al (Polyimide Structure-Property Relationships. II. Polymers from Isomeric Diamines, Journal of Polymer Science Polymer Chemistry Edition vol. 14, 2275-2292 (1976)).*
Dalton, Matthew J.; Kannan, Ramamurthi; Jakubiak, Rachel; Haley, Joy E.; Tan, Loon-Seng. "Synthesis and characterization of novel aromatic imide polymer and co-polymers containing diphenylaminofluorene-benzothiazole as two-photon chromophoric units." Polymer Preprints (American Chemical Society, Division of Polymer Chemistry) (2009), 50(1), 495-496.
Jhaveri, Shalin J.; McMullen, Jesse D.; Sijbesma, Rint; Tan, Loon-Seng; Zipfel, Warren; Ober, Christopher K. Direct Three-Dimensional Microfabrication of Hydrogels via Two—Photon Lithography in Aqueous Solution. Chemistry of Materials (2009), 21(10), 2003-2006.
Rogers, Joy E.; Slagle, Jonathan E.; McLean, Daniel G.; Sutherland, Richard L.; Brant, Mark C.; Heinrichs, James; Jakubiak, Rachel; Kannan, Ramamurthi; Tan, Loon-Seng; Fleitz, Paul A. Insight into the Nonlinear Absorbance of Two Related Series of Two—Photon Absorbing Chromophores. Journal of Physical Chemistry A (2007), 111(10), 1899-1906.
He, Guang S.; Tan, Loon-Seng; Zheng, Qingdong; Prasad, Paras N. Multiphoton Absorbing Materials: Molecular Designs, Characterizations, and Applications. Chemical Reviews (Washington, DC, United States) (2008), 108(4), 1245-1330.
Kannan, Ramamurthi; He, Guang S.; Lin, Tzu-Chau; Prasad, Paras N.; Vaia, Richard A.; Tan, Loon-Seng. Toward Highly Active Two-Photon Absorbing Liquids. Synthesis and Characterization of 1,3,5-Triazine-Based Octupolar Molecules. Chemistry of Materials (2004), 16(1), 185-194.
He, Guang S.; Lin, Tzu-Chau; Dai, Jianming; Prasad, Paras N.; Kannan, Ramamurthi; Dombroskie, Ann G.; Vaia, Richard A.; Tan, Loon-Seng. Degenerate two-photon-absorption spectral studies of highly two-photon active organic chromophores. Journal of Chemical Physics (2004), 120(11), 5275-5284.
Kannan, Ramamurthi; He, Guang S.; Yuan, Lixiang; Xu, Faming; Prasad, Paras N.; Dombroskie, Ann G.; Reinhardt, Bruce A.; Baur, Jeffery W.; Vaia, Richard A.; Tan, Loon-Seng. Diphenylaminofluorene-Based Two-Photon-Absorbing Chromophores with Various π—Electron Acceptors. Chemistry of Materials (2001), 13(5), 1896-1904.
Siwy, Mariola; Jarzabek, Bozena; Switkowski, Krzysztof; Pura, Bronislaw; Schab-Balcerzak, Ewa. Novel poly(esterimide)s containing a push-pull type azobenzene moiety-synthesis, characterization and optical properties. Polymer Journal (Tokyo, Japan) (2008), 40(9), 813-824.

* cited by examiner

*Primary Examiner* — Randy Gulakowski
*Assistant Examiner* — Rachel Kahn
(74) *Attorney, Agent, or Firm* — AFMCLO/JAZ; Rebecca Greendyke

(57) ABSTRACT

Provided are novel polyimides, poly(amide-imides) and polyamides, which are generated from new two photon diamino-monomers of the formula:

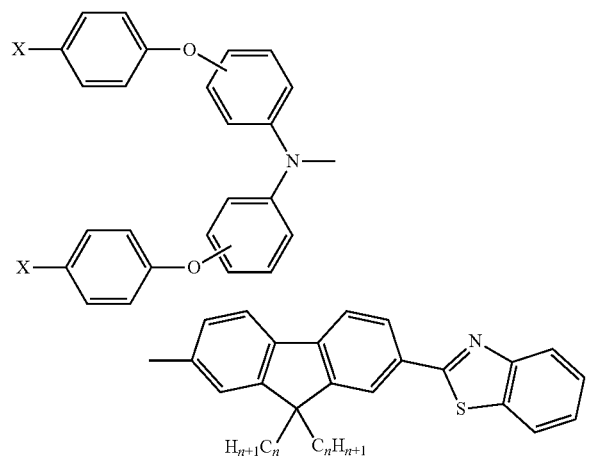

wherein para or meta X—$C_6H_4$—O— and X=$NH_2$; and $C_nH_{n+1}$ is either a straight or branched alkyl chain, and wherein n is an integer from 1 to 20.

1 Claim, No Drawings

AROMATIC POLYIMIDES, POLYAMIDES AND POLY(AMIDE-IMIDE) CONTAINING DIARYLAMINOFLUORENE-BENZOTHIAZOLE MOIETIES AS TWO-PHOTON ACTIVE UNITS

CROSS REFERENCE TO RELATED APPLICATION

This application claims priority of the filing date of provisional application Ser. No. 61/307,033 filed Feb. 23, 2010.

RIGHTS OF THE GOVERNMENT

The invention described herein may be manufactured and used by or for the Government of the United States for all governmental purposes without the payment of any royalty.

BACKGROUND OF THE INVENTION

The present invention relates to polymers with covalently bonded chromophores with large, effective two-photon absorption cross-sections.

Aromatic polyimides, polyamides, and poly(amide-imides) are high performance, heat-resistant polymers with a broad spectrum of applications. For example, aromatic polyimides clearly stand out with a balance of polymer properties that can be structurally tailored with relative ease via specific monomer designs (usually the diamine monomers because of their generally easier synthesis than those of dianhydrides) and/or co-polymerization processes. In addition, large-area processability via the poly(amic acid) precursor route is a unique and attractive feature. With such advantages that are important to scalability and cost considerations, polyimides are frequently the materials of choice for a broad-spectrum of applications, ranging from lightweight, heat-resistant structural composites, adhesives, and antenna membranes for the aerospace and space sectors to dielectric films and laminates, printed circuit boards, photoresists, and orientation layers for electronic and photonic applications. In addition, polyimides find utility as gas separation membranes because of their excellent thermal, mechanical, electrical, and chemical resistance properties. However, in the field of nonlinear optics (NLO), polyimides have been largely investigated with respect to their second-order NLO properties for electro-optical niche applications, and to a lesser extent, their third-order NLO properties for optical data storage.

Two-photon or multiphoton absorption occurs through the simultaneous absorption of two or more photons via virtual states in an absorbing medium, with the former being more common. For a given chromophore, these absorption processes take place at wavelengths much longer than the cut-off wavelength of its linear (single-photon) absorption. In the case of two-photon absorption (2PA), two quanta of photons may be absorbed from a single light source (degenerate 2PA) or two sources of different wavelengths (non-degenerate 2PA). Although multiphoton absorption processes have been theoretically described in 1931 and experimentally confirmed about 30 years later, this field remained dormant largely due to the lack of materials with sufficiently large two-photon sensitivity, quantified as two-photon cross-section ($\sigma_2'$), which is usually expressed in the units of Göppert-Mayer (1 GM=$10^{-50}$ cm$^4$.s.photon$^{-1}$.molecule$^{-1}$).

Then, in the mid-1990s, several new classes of chromophores exhibiting very large effective $\sigma_2'$ values were reported. In conjunction with the increased availability of ultrafast high-intensity lasers, the renewed interest has not only sparked a flurry of activities in the preparation of novel dye molecules with enhanced $\sigma_2'$ values, but also in advancing many previously conceived applications based on 2PA process in photonics and biophotonics, which are now enabled by these new chromophores. It is important to recognize the following useful features of the 2PA phenomenon based on the fact that 2PA scales nonlinearly with the squared intensity of the incident laser beam: (a) upconverted emission, whereby an incident light at lower frequency (energy) can be converted to an output light at higher frequency, for instance, near infrared (NIR) to ultraviolet (UV) upconversion; (b) deeper penetration of incident NIR light (into tissue samples, for example) than UV light that also may be hazardous with prolonged exposure; (c) highly localized excitation as compared with one-photon processes allowing for precise spatial control of in situ photochemical or photophysical events in the absorbing medium, thereby minimizing undesirable activities such as photodegradation or photobleaching; and (d) fluorescence, when properly manipulated, that would allow for information/signal feedback or amplification in conjunction with other possible, built-in effects such as surface plasmonic enhancement.

It is anticipated that further ingenious utilization of these basic characteristics will lead to practical applications other than the ones that have already emerged in such diverse areas as bio-medical fluorescence imaging, data storage, protection against accidental laser damage, microfabrication of micro-electromechanical systems (MEMS), photodynamic therapy, etc. In the past decade or so, significant advances have been made in the fundamental understanding of general structure-property relationship that has led to the design and synthesis of two-photon absorbers with very large cross-section values. Although further enhancement of 2PA cross-section is still possible as suggested by a number of theoretical studies, for certain applications, the two-photon-property requirement has essentially been met by the state-of-art chromophores. Because of the possible property-processing/fabrication trade-off, the secondary properties, e.g. thermal and mechanical properties, which are important to material processing into various useful forms (films, coatings, fibers, windows etc.) and configurations, should be addressed. For the aforementioned solid forms, polymers can offer many advantages such as the flexibility in fine-tuning the material properties and the availability of many processing options.

Accordingly, it is an object of the present invention to provide two-photon active linear polymers that contain in their repeat units the essential components such as electron-donating triarylamine and electron-accepting benzothiazole moieties when in combination are known for high 2PA response. Specifically, the object is to provide high performance polymers such as polyimides, polyamides and poly(amide-imides) for nonlinear optical applications that require high 2PA properties.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided new 2PA polymers belonging to three common classes of high-performance polymers: (a) polyimides of the formula

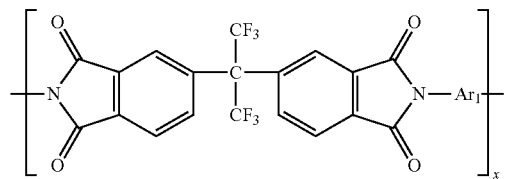

(b) poly(imide-amides) of the formula

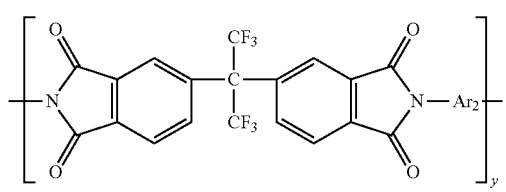

and (c) polyamides of the formula

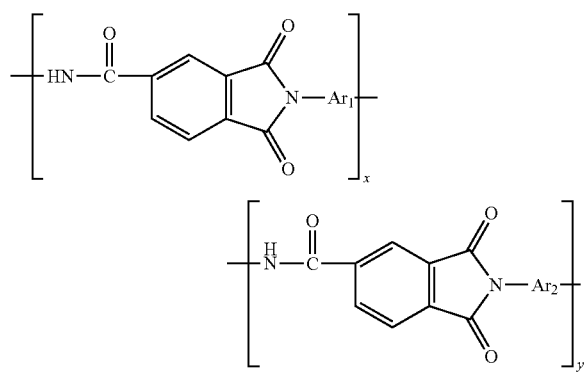

wherein $Ar_1 =$

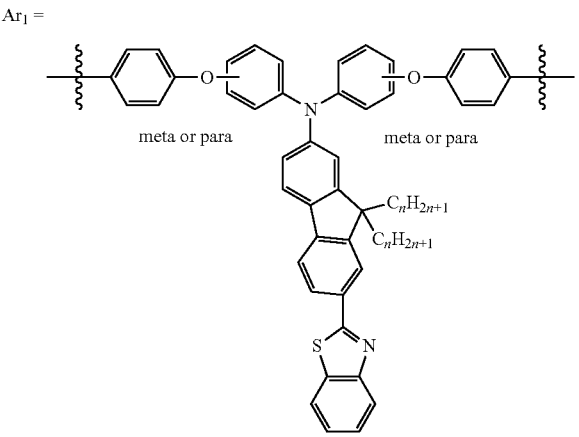

$Ar_2 =$

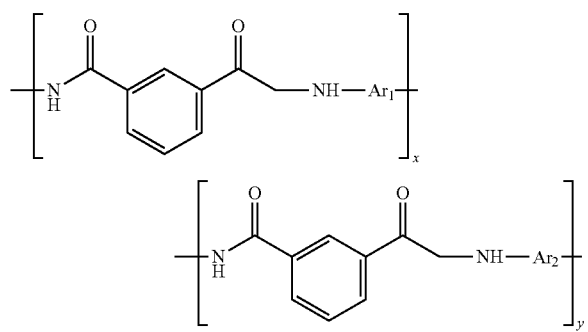

wherein x=from about 0.01 to about 1.0, preferably from 0.40 to 0.95; and y=1.00−x; and $C_nH_{2n+1}$ is a straight or branched alkyl chain, wherein n is an integer from 1 to 20, preferably n is from 1 to 10.

DETAILED DESCRIPTION OF THE INVENTION

The general synthetic scheme of the dinitro precursors and the corresponding diamino monomers is depicted in Scheme 1. It is known that aromatic diamines can serve as the common co-monomers for polyimide, polyamides, and poly (amide-imides). In addition, the parent compound (2a, R=H, see Scheme 1) designated as AF-240 has a relatively high effective two-photon cross-section (effective (nanosecond) $\sigma_2'$ value of 9,800 GM at 800 nm) and a number of structurally related, monofunctionized (see U.S. Pat. No. 7,067,674) and difunctionalized (see U.S. Pat. No. 7,319,151) derivatives are also highly two-photon active. Based on this structural motif and together with the molecular symmetry consideration to avoid unequal reactivity, the required diamines in the present invention were designed with functionalization taking place at the 3,3'- and 4,4'-positions of the diphenylamino (donor) segment of AF240. The important intermediates to the targeted monomers, namely the 3,3'-bis(phenol) and 4,4'-bis (phenol), compounds 4c and 4 d respectively in Scheme 1, were synthesized via (i) a Pd-catalyzed amination from the fluorenyl bromide 1 and 3,3'-dimethoxydiphenylamine or 4,4'-dimethoxydiphenylamine, followed by (ii) demethylation with liquid pyridinium chloride. The diamino monomer was synthesized from the (iii) double aromatic substitution reaction of 3a or 3b and 4-fluoro-1-nitrobenzene in the presence of potassium carbonate, followed by (iv) catalytic reduction with dihydrogen or hydrazine hydrate.

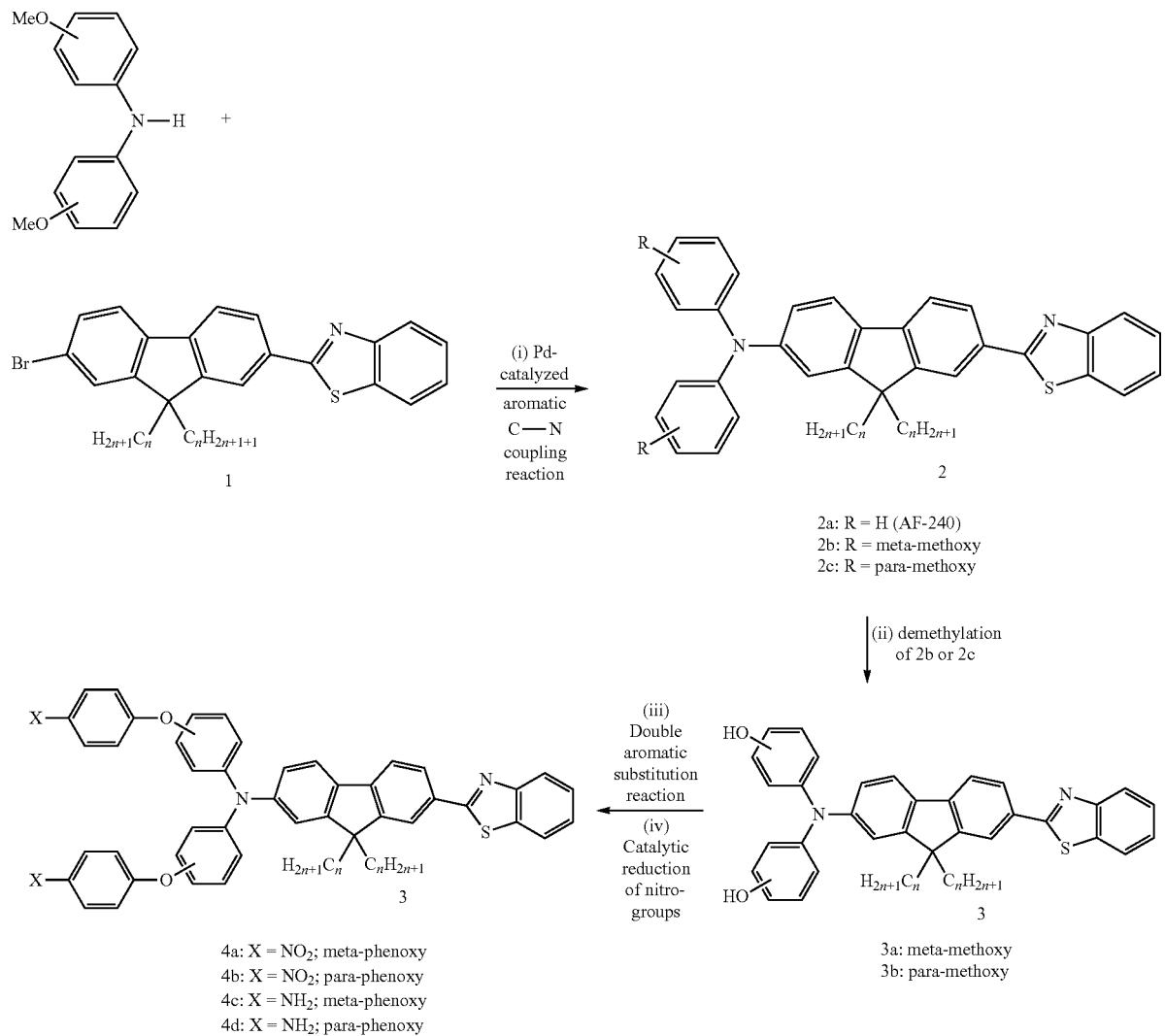

Scheme 1: Synthesis of Dinitro Precursors and Diamino Monomers

The subject polyimides were prepared as depicted in Scheme 2. First, the poly(amic acids) were formed by stirring the requisite co-monomers in appropriate molar ratios, 2PA-active diamino-monomer (compound 4c or 4d), 1,3-bis(3-aminophenoxy)benzene (APB) and 2,2-bis(phthalic anhydride)-1,1,1,3,3,3-hexafluoroisopropane (6-FDA) in anhydrous DMAc for 24-36 hr followed by chemical imidization with acetic anhydride and pyridine (4 equivalents) for 24 hr. The content of two-photon active diamine was varied between 0 and 100% to give polyimides 6a-e in purified yields of 80-90%.

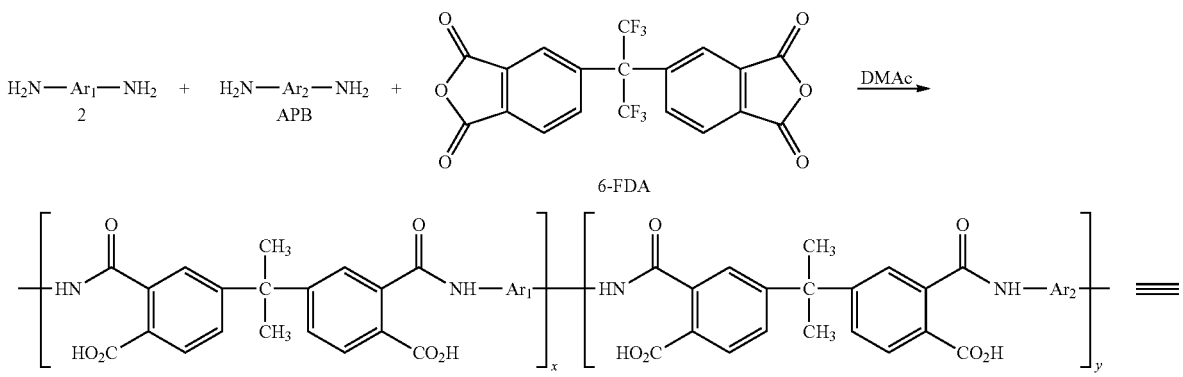

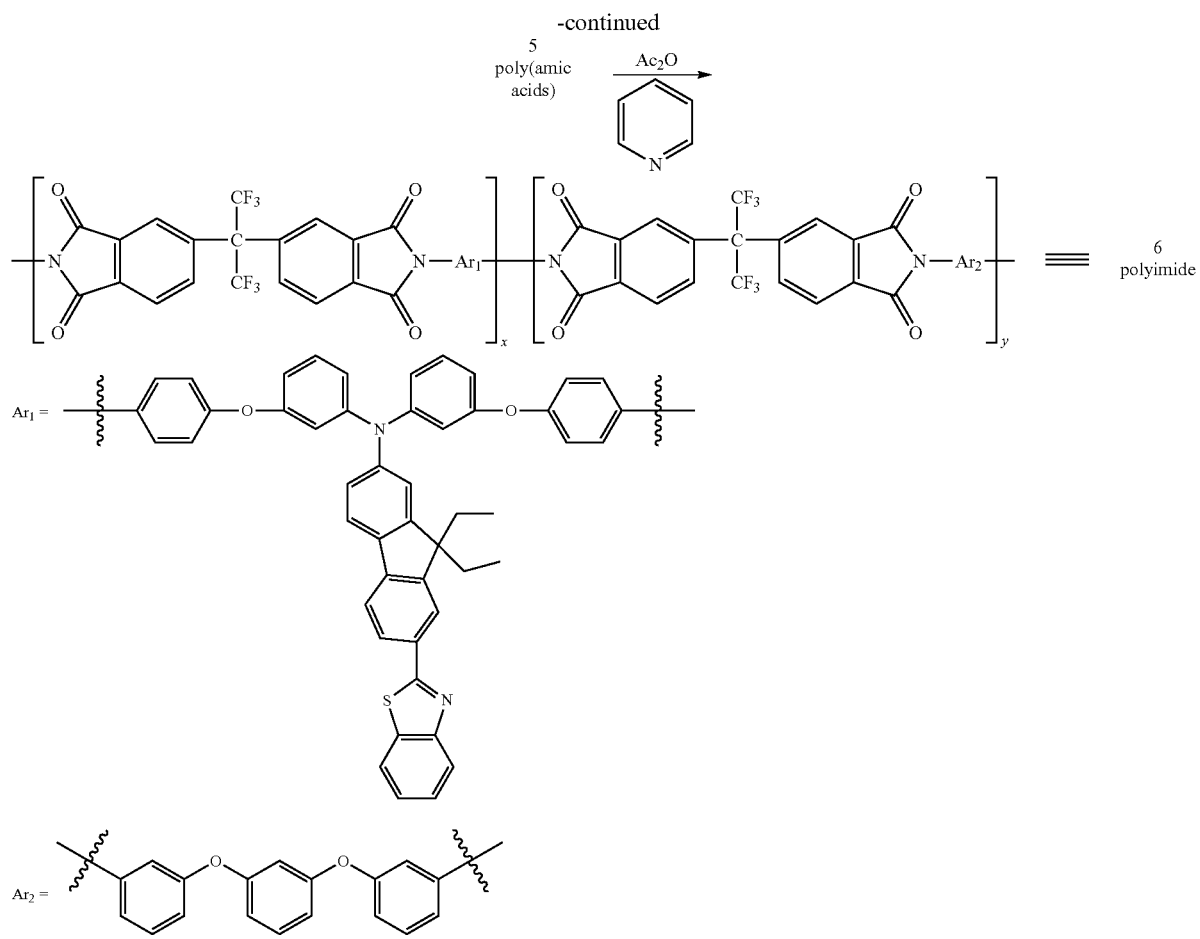

| X/Y | |
|---|---|
| 6a | 0/100 |
| 6b | 10/90 |
| 6c | 30/70 |
| 6d | 50/50 |
| 6e | 100/0 |

Scheme 2: General Scheme for the Preparation of Two-Photon Active Polyimides and their Poly(Amic Acid) Precursors Similarly, two-photon active polyamides and poly(amide-imides) could be prepared. For example, polymerization of N,N-di[3-(4-aminophenoxy)phenyl]-7-(benzothiazol-2-yl)-9,9-diethyl-fluoren-2-amine (compound 4c in Scheme 1 and Example 8) and isophthaloyl chloride has led to the formation of subject polyamide (Example 19), and polymerization of N,N-di[3-(4-aminophenoxy)phenyl]-7-(benzothiazol-2-yl)-9,9-diethyl-fluoren-2-amine and trimellitic anhydride chloride has resulted in the formation of the subject poly(amide-imide), see Example 20.

The polyimides, polyamides, and poly(amide-imides) of this invention can be synthesized following the procedures given in the following Examples which illustrate the invention:

Example 1

2,7-Dibromofluorene

To a mechanically stirred mixture of fluorene (113.76 g, 0.68 mol), iodine (1.96 g, 0.0077 mol), and methylene chloride (750 mL), bromine (74 mL, 1.44 mol) diluted with methylene chloride (100 mL) was added dropwise at room temperature over a period of 1.5 hours. After 5 minutes, a solution of sodium bisulfite (15.0 g) in water (100 mL) was added and the mixture was stirred for 30 minutes, when the mixture became colorless. Water (750 mL) was then added, and methylene chloride was distilled off. The product slurry was filtered and the product was air-dried, 220.5 g, m.p. 156-160° C. This material was used in the next step without further purification.

Example 2

9,9-Diethyl-2,7-dibromofluorene

To a mechanically stirred mixture of 2,7-dibromofluorene (Example 1; 66.5 g, 0.205 mol) powdered potassium hydroxide (56.0 g, 1.0 mol), potassium iodide (3.4 g) and DMSO (150 mL), cooled to 10° C., ethyl bromide (40 ml, 58.4 g, 0.536 mol) was added dropwise over 45 minutes. The mixture turned from red to light purple. After allowing the temperature to warm to 20° C., the mixture was left overnight to stir and poured into water, 77.0 g. (98.7% yield), m.p. 144-153° C. The product was then recrystallized from hexane (550 mL) with charcoal treatment, and collected in two crops, m.p. 154-157° C. and 153-154° C., totaling 60.36 g. (77.4% yield).

Example 3

9,9-Diethyl-7-bromo-fluorene-2-carboxaldehyde

To a mechanically stirred solution of 9,9-diethyl-2,7-dibromofluorene (Example 2; 59.38 g, 0.1563 mol) in THF (325 mL) cooled in dry ice-ethanol bath, n-butyl lithium (104 mL of 1.6M solution in hexanes, 0.1664 mol, 1.06 eq.) was added dropwise over 25 minutes. After 20 minutes, DMF (17 mL, 0.22 mol) in THF (30 mL) was added, and the mixture was stirred in the cooling bath for 1.5 hours, and outside the bath for 1 hour. The reaction was then cooled to 5° C. and treated with hydrochloric acid (12.5 of concentrated hydrochloric acid diluted with 50 mL water). The mixture was diluted with 200 mL of toluene, and the aqueous phase was separated and extracted with 200 mL of toluene. The combined organic phase was washed with dilute sodium bicarbonate solution, dried over magnesium sulfate and concentrated. The residual solids were recrystallized from heptane-ethyl acetate (9:1) mixture, to get colorless solids, 40.29 g (78.4% yield), m.p. 126-128° C. The mother liquor after chromatography over 150 g of silica gel, elution with 1:1 heptane-toluene mixture, and trituration of residual solids in hexanes gave additional product, 6.56 g (12.8% yield, total 91% yield), m.p. 126-128° C. Mass Spec: m/z 328, 330, (M+). A sample for analysis was prepared by recrystallization from hexanes, m.p. 127-129° C. Analysis: Calculated for $C_{18}H_{17}BrO$: C, 65.55%; H, 5.20%; Br, 24.27%. Found: C, 65.60%; H, 5.51%; Br, 24.71%.

Example 4

7-(Benzothiazol-2-yl)-9,9-diethyl-2-bromofluorene

A mixture of 9,9-diethyl-7-bromo-fluorene-2-carboxaldehyde (Example 3; 49.35 g, 0.15 mol), 2-aminothiophenol (20 mL, 0.187 mol, 1.25 eq.), and DMSO (110 mL) was heated in an oil bath to a bath temperature of 195° C., held there for 45 minutes, and then poured into water. The separated solids were collected, reslurried in 1:4 acetic acid-water (1000 mL), filtered, and washed with water and dilute sodium bicarbonate solution. These solids, 80.05 g, were then reslurried in hot ethanol (600 mL) cooled and filtered to get the product, 45.69 g, m.p. 133.6-135° C. An additional 6.6 g, m.p. 134.6-135.5° C., was obtained by chromatography of the ethanol filtrate. Total recovery 52.29 g. (80.3% yield). Mass Spec: m/z 433, 435, (M+). Analysis: Calculated for $C_{24}H_{20}BrNS$: C, 66.37%; H, 4.64%; Br, 18.40%; N, 3.23%; S 7.37%. Found: C, 66.46%; H, 4.52%; Br, 18.54%; N, 3.14%; S, 7.19%.

Example 5

N,N-Di(3-methoxyphenyl)-7-(benzothiazol-2-yl)-9, 9-diethyl-fluoren-2-amine

A mixture of 7-benzothiazol-2-yl-9,9-diethyl-2-bromofluorene (Example 4; 10.85 g, 25 mmol), 3,3'-dimethoxydiphenylamine (6.87 g, 30 mmol) and toluene (100 mL) was azeotroped dry under nitrogen and cooled. Bis(dibenzylidene acetone)palladium (0) (0.28 g, 0.49 mmol), bis(diphenylphosphino)ferrocene (0.25 g, 0.45 mmol) and sodium-t-butoxide (3.5 g, 36.4 mmol) were then added and the mixture was heated to 100° C. After 24 hours, the mixture was cooled, diluted with toluene and filtered. The filtrate was washed with water, dried and concentrated. The residue was chromatographed over silica gel. Elution with toluene-heptane (3:1) mixture gave the product, which was recrystallized from a mixture of toluene-heptane, m.p. 178-179.5° C., 11.13 g (76% yield). $^1$H NMR (CDCl$_3$) δ ppm: 0.35-0.41 (t, 6H), 1.91-2.14 (m, 4H), 3.69 (s, 6H), 6.54-6.74, 7.05-7.68, 7.84-8.10 (m, 18H). $^{13}$C NMR (CDCl$_3$) δ ppm: 8.61, 32.66, 55.18, 56.44 (sp$^3$C), 108.62, 109.77, 116.66, 119.16, 119.42, 121.00, 121.44, 121.52, 122.94, 123.77, 124.95, 126.28, 127.28, 129.82, 131.55, 134.91, 135.61, 144.48, 147.84, 148.94, 150.67, 151.99, 154.24, 160.46, 168.81 (sp$^2$C). Anal. Calcd for $C_{38}H_{34}N_2O_2S$: C, 78.33%; H, 5.88%; N, 4.81%; S, 5.49%. Found: C, 78.26%; H, 5.96%; N, 4.68%; S, 5.47%.

Example 6

N,N-Di(3-hydroxyphenyl)-7-(benzothiazol-2-yl)-9, 9-diethyl-fluoren-2-amine

A mixture of N,N-di(3-methoxyphenyl)-7-(benzothiazol-2-yl)-9,9-diethyl-fluoren-2-amine (Example 5; 1 g), and pyridine hydrochloride (10 g) was held at 200° C. in an oil bath for 10 hours, cooled, slurried in water, and the red solids were collected. These were slurried in dilute ammonium hydroxide to get the greenish yellow solid product, 1.13 g, m.p. 314-316° C. EIMS: m/z 554 (M+). Anal. Calcd for $C_{36}H_{30}N_2O_2S$: C, 77.95%; H, 5.45%; N, 5.05%; S, 5.78%. Found: C, 77.74%; H, 5.39%; N, 4.83%; S, 5.78%.

Example 7

N,N-Di[3-(4-nitrophenoxy)phenyl]-7-(benzothiazol-2-yl)-9,9-diethyl-fluoren-2-amine A mixture of N,N-di(3-hydroxyphenyl)-7-(benzothiazol-2-yl)-9,9-diethyl-fluoren-2-amine (Example 6; 2.94 g, 5.3 mmol), 4-nitrofluorobenzene (2.56 g, 20 mmol), potassium carbonate (2.29 g, 16.6 mmol) and DMAc (27 mL) was held at 97° C. for 5 hr, and then poured into water. The separated solids (4.38 g) were transferred to a column of silica gel and eluted with toluene to get the product, 4.12 g (97% yield), m.p. 200-201° C. Recrystallization from a toluene-heptane mixture provided a purer sample with m.p. 202-203° C. $^1$H NMR (400 MHz, CDCl$_3$) δ ppm: 8.15-8.22 (m, 4H), 8.07-8.12 (m, 2H), 8.02 (dd, J$_1$=7.9 Hz, J$_2$=1.6 Hz, 1H), 7.91 (d, J=7.9 Hz, 1H), 7.72 (d, J=7.9 Hz, 1H), 7.68 (d, J=8.1 Hz, 1H), 7.45-7.55 (m, 1H), 7.36-7.42 (m, 1H), 7.31 (t, J=8.1 Hz, 2H), 7.12-7.2 (m, 2H), 6.98-7.05 (m, 6H), 6.89 (t, J=2.2 Hz, 2H), 6.72-6.77 (m, 2H), 1.88-2.15 (m, 4H), 0.31 (t, J=7 Hz, 6H); $^{13}$C NMR (100 MHz, CDCl$_3$) δ ppm: 168.52, 162.96, 155.53, 154.15, 152.45, 150.66, 149.23, 146.49, 143.77, 142.63, 137.09, 134.90, 132.07, 130.83, 127.32, 126.31, 125.90, 125.05, 124.54, 122.97, 121.55, 121.47, 121.40, 120.19, 120.09, 119.73, 117.00, 115.47, 114.66, 56.49, 32.61, 8.55. MS (m/z): 796 (M+). Anal. Calcd. for $C_{48}H_{36}N_4O_6S$: C, 72.35%; H, 4.55%; N, 7.03%; S, 4.02%. Found: C, 72.15%; H, 4.87%; N, 6.87%; S, 3.95%.

Example 8

N,N-Di[3(4-aminophenoxy)phenyl]-7-(benzothiazol-2-yl)-9,9-diethyl-fluoren-2-amine To a solution of N,N-di[3-(4-nitrophenoxy)phenyl]-7-(benzothiazol-2-yl)-9,9-diethyl-fluoren-2-amine (Example 7; 13.68 g, 17.2 mmol) in 300 mL of 1/1 tetrahydrofuran/ ethanol mixture under argon was added 10% palladium/carbon (500 mg). The mixture was heated to 60° C., and hydrazine hydrate (12.7 mL, ~206 mmol) was added slowly over 40 min by addition funnel. The solution became dark, fluorescent green and, after 8 hr, was cooled to room temperature and poured into 1.5 L of distilled water. After a few hours of stirring to evaporate some THF, a fine yellow solid was filtered and purified by column chromatography eluting with ethyl acetate/toluene. The product was further slurried in 100 mL of hot EtOH, filtered at room temperature, and dried in vacuo at 70° C. overnight to give 8.4 g (65%). $^1$H NMR (400 MHz, CDCl$_3$) δ ppm: 8.08 (m, 2H), 8.01 (dd, J$_1$=8 Hz, J$_2$=1.6 Hz, 1H), 7.91 (d, J=8 Hz, 1H), 7.70 (d, J=8 Hz, 1H), 7.48-7.55 (m, 1H), 7.35-7.42 (m, 1H), 7.05-7.18 (m, 4H), 6.52-6.59 (m, 2H), 3.5-3.6 (br. s, 4H), 1.95-2.15 (m, 4H), 0.34 (t, J=7 Hz, 6H); $^{13}$C NMR (100 MHz, CDCl$_3$) δ ppm: 168.97, 159.73, 154.38, 152.23, 150.91, 149.04, 148.61, 147.69, 144.56, 142.72, 135.98, 135.07, 131.71, 129.98, 127.39, 126.42, 125.11, 124.19, 123.08, 121.68, 121.59, 121.19, 121.00, 119.60, 119.54, 117.90, 116.31, 113.33, 111.70, 56.57, 32.77, 8.73; MS (m/z): 736 (M$^+$); Anal. Calcd. for C$_{48}$H$_{40}$N$_4$O$_2$S: C, 78.23%; H, 5.47%; N, 7.60%; S, 4.35%%. Found: C, 78.01%%; H, 5.60%%; N, 7.62%%; S, 4.31%.

Example 9

N,N-Di(4-methoxyphenyl)-7-(benzothiazol-2-yl)-9, 9-diethyl-fluoren-2-yl)-amine

A mixture of 7-(benzothiazol-2-yl)-9,9-diethyl-2-bromofluorene (Example 4; 10.14 g, 23.4 mmol), 4,4'-dimethoxydiphenylamine (Alpha Aesar, 5.26 g, 23.0 mmol), and toluene (100 mL) was azeotroped dry under nitrogen and cooled. Palladium(II) acetate (84.3 mg, 0.375 mmol), bis(dibenzylidene acetone)palladium(0) (228.3 mg, 0.412 mmol) and sodium t-butoxide (2.53 g, 26.3 mmol) were then added, and the reaction mixture was held at 96° C. for 20 hours. After cooling, the mixture was diluted with toluene, and the solution was washed with water, dried and concentrated. The residue (13.6 g) was chromatographed over silica gel, and the column was eluted with toluene to get the product, which was crystallized from a mixture of toluene and heptane, 11.6 g (84% yield), m.p. 187-189° C. The second run of the synthesis under similar conditions led to isolation of the product with m.p. 190.1-192.6° C., and in yield 79%. Mass spec: m/z 582 (M$^+$). Anal. Calcd for C$_{38}$H$_{34}$N$_2$O$_2$S: C, 78.33%; H, 5.88%; N, 4.81%; S, 5.49%. Found: C, 78.38%; H, 6.00%; N, 4.70%; S, 5.30%. $^1$H NMR (CDCl$_3$) δ ppm: 0.38 (t, 6H, 7.3 Hz), 1.8-1.93 (m, 2H), 2.04-2.09 (m, 2H), 3.79 (s, 6H), 6.83-6.85 (m, 4H), 6.90-6.93 (m, 1H), 7.09 (d, 4H, 8.8 Hz), 7.33 (t, 1H, 7.7 Hz), 7.46 (t, 1H, 7.5 Hz, 7.52 (d, 1H, 8.3 Hz), 7.63 (d, 1H, 7.90 Hz), 7.86 (d, 1H, 7.92 Hz), 7.97 (d, 1H, 8.0 Hz), 8.06 (d, 2H, 6.92 Hz). $^{13}$C NMR (CDCl$_3$) δ ppm: 8.74, 32.73, 55.55, 56.37 (4 sp$^3$C), 114.75, 115.70, 119.07, 120.36, 120.88, 121.42, 121.60, 122.94, 124.96, 126.31, 126.36, 127.36, 131.04, 133.53, 134.97, 141.24, 144.93, 149.23, 150.52, 152.11, 154.34, 155.81, and 169.05 (23 sp$^2$C).

Example 10

N,N-Di(4-hydroxyphenyl)-7-(benzothiazol-2-yl)-9, 9-diethyl-fluoren-2-amine

A mixture of N,N-di(4-methoxyphenyl)-7-(benzothiazol-2-yl)-9,9-diethyl-fluoren-2-amine, (Example 9; 11.0 g, 18.9 mmol), 2-aminothiophenol (9.0 mL, 10.53 g, 84.0 mmol), potassium carbonate (0.58 g, 4.2 mmol) and 1-methylpyrrolidine-2-one (NMP, 50 mL) was heated to 195° C., and held at this temperature for 6 hours. After cooling, the mixture was poured into a mixture of acetic acid (100 mL) and water (750 mL). The separated solids were collected and reslurried in a mixture of ethanol (100 mL) and toluene (50 mL), and the insoluble solids, 7.44 g, m.p. 294-297° C. were collected. Additional 2.71 g, with the same melting point was obtained by concentration of the filtrate, and slurrying the crude product in toluene. Total product recovered was 10.15 g (97% yield). A sample for analysis was prepared by heating 1 g of the sample with 2:1 acetic-acid-water mixture (75 mL), 0.98 g, m.p. 294.2-294.5° C. Mass spec: m/z 554 (M$^+$). Anal. Calcd for C$_{36}$H$_{30}$N$_2$O$_2$S: C, 77.95%; H, 5.45%; N, 5.05%; S, 5.78%. Found; C, 77.95%; H, 5.53%; N, 5.18%; S, 5.90%. $^1$H NMR (DMSO-d$_6$) δ ppm: 0.30 (t, 6H, 7.3 Hz), 1.80-1.84 (m, 2H), 1.99-2.04 (m, 2H), 6.70-6.81 (m, 6H), 6.94-6.97 (m, 4H), 7.42-7.46 (m, 1H), 7.52-7.56 (m, 1H), 7.65 (d, 1H, 8.4 Hz), 7.78 (d, 1H, 7.92 Hz), 7.97-8.13 (m, 4H), 9.38 (s, 2H). $^{13}$C NMR (DMSO-d$_6$) δ ppm: 8.96, 32.23, 56.01 (3 sp$^3$C), 113.42, 116.71, 118.47, 119.66, 121.28, 121.77, 122.68, 123.02, 125.69, 127.06, 127.42, 127.59, 130.52, 131.90, 134.77, 139.22, 145.09, 150.09, 150.34, 151.87, 154.15, 154.50, and 169.38 (23 sp$^2$C).

Example 11

N,N-Di[4-(4-nitrophenoxy)phenyl]-7-(benzothiazol-2-yl)-9,9-diethyl-fluoren-2-amine A mixture of N,N-di(4-hydroxyphenyl)-7-(benzothiazol-2-yl)-9,9-diethyl-fluoren-2-amine (Example 10; 8.31 g, 15.0 mmol), 4-nitrofluorobenzene (6.34 g, 44.93 mmol), potassium carbonate (6.30 g, 45.6 mmol) and DMAC (74 mL) was held at 120° C. for 4 hours under nitrogen, cooled, and poured into water. The separated solids were collected, and crystallized from a mixture of toluene and heptane to get the product, 10.17 g (85% yield), m.p. 223-225° C. Additional 1.1 g (9% yield) of the product was recovered after chromatography of the crystallization liquor on silica gel, elution with 2.5% ethyl-acetate-toluene mixture, and crystallization. A sample for analysis was prepared by two successive recrystallizations from toluene, m.p. 225.7-226.5° C. Mass spec: m/z 796 (M$^+$). Anal. Calcd for C$_{48}$H$_{36}$N$_4$O$_6$S: C, 72.35%; H, 4.55%; N, 7.03%; S, 4.02%. Found: C, 72.63%; H, 4.65%; N, 7.11%; S, 4.05%. $^1$H NMR (CDCl$_3$) δ ppm: 0.40 (t, 6H, 7.6 Hz), 1.94-2.08 (m, 2H), 2.10-2.17 (m, 2H), 7.02-7.13 (m, 10H), 7.20-7.26 (m, 4H), 7.38 (t, 1H, 7.4 Hz), 7.50 (t, 1H, 7.4 Hz), 7.71 (d, 2H, 7.92 Hz), 7.91 (d, 1H, 7.92 Hz), 8.03 (d, 1H, 8.0 Hz), 8.07-8.11 (m, 2H), 8.23 (d, 4H, 9.16 Hz). $^{13}$C NMR (CDCl$_3$) δ ppm: 8.64, 32.63, 56.48 (3 sp$^3$C), 116.33, 119.01, 119.57, 121.31, 121.53, 121.56, 122.99, 123.41, 125.06, 125.41, 125.99, 126.33, 127.36, 131.88, 134.95, 136.14, 142.66, 144.06, 145.07, 147.55, 149.92, 150.71, 152.46, 152.24, 163.45, and 168.64 (26 sp$^2$C).

Example 12

N,N-Di[4-(4-aminophenoxy)phenyl]-7-(benzothiazol-2-yl)-9,9-diethyl-fluoren-2-amine To a mixture of N,N-di[4-(4-nitrophenoxy)phenyl]-7-(benzothiazol-2-yl)-9,9-diethyl-fluoren-2-amine (Example 11; 5.25 g, 6.6 mmol), DMAC (75 mL), ethanol (50 mL), and 10% palladium on charcoal catalyst (0.51 g) heated to 70° C., a mixture of hydrazine hydrate (4.9 mL), and ethanol (7 mL) was added in portions over 15 minutes. After two hours at 75°

C., the mixture was cooled and poured into water. The separated solids were collected, and transferred to a column of silica gel. Elution with 3:1 toluene-ethyl-acetate mixture gave the product, 2.61 g (54% yield), m.p. 192-194° C. Recrystallization from a mixture of ethyl acetate and hexanes did not raise the m.p. Mass spec: m/z 736 (M+). Anal. Calcd. for $C_{48}H_{40}N_4O_2S$: C, 78.23%; H, 5.47%; N, 7.60%; S, 4.35%. Found: C, 78.23%; H, 5.56%; N, 7.55%; S, 4.41%. $^1$H NMR (CDCl$_3$) δ ppm: 0.37 (t, 6H, 7.32 Hz), 1.88-1.97 (m, 2H), 2.03-2.11 (m, 2H), 3.57 (s, 4H), 6.64-6.73 (m, 4H), 6.85-6.92 (m, 8H), 6.94-6.98 (m, 1H), 7.00-7.10 (m, 5H), 7.36 (t, 1H, 8.16 Hz), 7.48 (t, 1H, 7.12 Hz), 7.55 (d, 1H, 8.28 Hz), 7.65 (m, 1H, 7.92 Hz), 7.89 (m, 1H, 7.6 Hz), 7.99 (dd, 1H, 1.6 and 7.92 Hz), 8.02-8.10 (m, 2H). $^{13}$C NMR (CDCl$_3$) δ ppm: 8.58, 32.59, 56.29 (3 sp$^3$C), 116.19, 116.64, 118.16, 119.09, 120.79, 120.84, 121.26, 121.37, 121.49, 122.86, 124.87, 125.81, 126.21, 127.22, 131.13, 134.12, 134.88, 142.36, 142.55, 144.64, 148.67, 148.86, 150.51, 152.06, 154.23, 154.53, and 168.90 (27 sp$^2$C).

Example 13

Polyimide with 100 mol % 2PA segment (6e)

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 1.4738 g, 2.00 mmol), and the vial was sealed with a Teflon-coated septum cap. Anhydrous N,N-dimethylacetamide (15 mL) was added by syringe to give a fluorescent solution. To the vial was charged 2,2-bis(phthalic anhydride)-1,1,1,3,3,3-hexafluoroisopropane (6-FDA, 99%; 0.8885 g, 2.00 mmol) under a stream of argon, and the vial was sealed under argon. After 40 hr, acetic anhydride (0.75 mL) and pyridine (0.65 mL) were added, and the mixture was stirred for 24 hr. The viscous solution was precipitated into 50/50 methanol/water (200 mL), and the yellow, fibrous solid was filtered and dried at 120° C. overnight in a vacuum oven. The solid was dissolved in chloroform (25 mL) and filtered through a 0.45 μm PTFE membrane directly into methanol (200 mL). The purified polymer was dried in vacuo at 120° C. overnight and further at 250° C. for 2 hr to yield 1.99 g (87%). $^1$H NMR (400 MHz, CDCl$_3$) δ ppm: 7.8-8.1 (m, 10H), 7.7 (d, J=8 Hz, 1H), 7.65 (d, J=8.1 Hz, 1H), 7.45-7.52 (m, 1H), 7.32-7.40 (m, 5H), 7.22-7.30 (m, 2H), 7.08-7.20 (m, 6H), 6.88-6.98 (m, 4H), 6.68-6.74 (m, 2H), 1.90-2.20 (m, 4H), 0.34 (t, J=7 Hz, 6H); $^{13}$C NMR (100 MHz, CDCl$_3$) δ ppm: 168.75, 166.17, 166.01, 157.35, 157.04, 154.19, 152.32, 150.79, 149.17, 147.08, 144.20, 139.10, 136.45, 135.90, 134.90, 132.62, 132.33, 131.74, 130.40, 127.93, 127.27, 126.29, 125.80, 125.29, 125.00, 124.22, 124.11, 122.93, 121.54, 121.46, 121.31, 119.73, 119.63, 119.40, 118.62, 115.29, 113.97, 65.50, 56.50, 32.66, 8.60.

Example 14

Polyimide with 10 mol % 2PA segment (6b)

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 0.1474 g, 0.20 mmol) and 1,3-bis(3-aminophenoxy)benzene (0.5262 g, 1.80 mmol), and the vial was sealed with a Teflon-coated septum cap. Anhydrous DMAc (15 mL) was added by syringe to give a fluorescent solution. To the vial was charged 2,2-bis(phthalic anhydride)-1,1,1,3,3,3-hexafluoroisopropane (6-FDA; 0.8885 g, 2.00 mmol) under a stream of argon, and the vial was sealed under argon. After 24 hr, an aliquot was taken for $^1$H NMR. Acetic anhydride (0.75 mL) and pyridine (0.65 mL) were then added, and the mixture was stirred for 24 hr. The viscous solution was precipitated into 50/50 methanol/water (200 mL), and the yellow, fibrous solid was filtered and dried at 120° C. overnight in a vacuum oven. The solid was dissolved in chloroform (25 mL) and filtered through a 0.45 μm PTFE membrane directly into methanol (200 mL). The purified polymer was dried in vacuo at 120° C. overnight and further at 250° C. for 2 hr to yield 1.05 g (71%). Anal. Calcd. for $C_{40}H_{20.4}F_6N_{22}O_6S_{0.1}$: C, 63.49%; H, 2.76%; N, 4.14%; S, 0.43%. Found: C, 64.38%; H, 2.80%; N, 3.94%; S, 0.60%.

Example 15

Polyimide with 30 mol % 2PA segment (6c)

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 0.4422 g, 0.60 mmol) and 1,3-bis(3-aminophenoxy)benzene (0.4093 g, 1.40 mmol), and the vial was sealed with a Teflon-coated septum cap. Anhydrous DMAc (15 mL) was added by syringe to give a fluorescent solution. To the vial was charged 2,2-bis(phthalic anhydride)-1,1,1,3,3,3-hexafluoroisopropane (6-FDA; 0.8885 g, 2.00 mmol) under a stream of argon, and the vial was sealed under argon. After 24 hr, acetic anhydride (0.75 mL) and pyridine (0.65 mL) were added, and the mixture was stirred for 24 hr. The viscous solution was precipitated into 50/50 methanol/water (200 mL), and the yellow, fibrous solid was filtered and dried at 120° C. overnight in a vacuum oven. The solid was dissolved in chloroform (25 mL) and filtered through a 0.45 μm PTFE membrane directly into methanol (200 mL). The purified polymer was dried in vacuo at 120° C. overnight and further at 250° C. for 2 hr to yield 1.43 g (86%). Anal. Calcd. for $C_{46}H_{25.2}F_6N_{2.6}O_6S_{0.3}$: C, 66.25%; H, 3.05%; N, 4.37%; S %, 1.15. Found: C, 65.85%; H, 3.19%; N, 4.22%; S, 1.19%.

Example 16

Polyimide with 50 mol % 2PA segment (6d)

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 0.7368 g, 1.00 mmol) and 1,3-bis(3-aminophenoxy)benzene (0.2923 g, 1.00 mmol), and the vial was sealed with a Teflon-coated septum cap. Anhydrous DMAc (13 mL) was added by syringe to give a fluorescent solution. To the vial was charged 2,2-bis(phthalic anhydride)-1,1,1,3,3,3-hexafluoroisopropane (6-FDA; 0.8885 g, 2.00 mmol) under a stream of argon, and the vial was sealed under argon. After 27 hr, acetic anhydride (0.75 mL) and pyridine (0.65 mL) were added, and the mixture was stirred for 24 hr. The viscous solution was precipitated into 50/50 methanol/water (200 mL), and the yellow, fibrous solid was filtered and dried at 120° C. overnight in a vacuum oven. The solid was dissolved in chloroform (25 mL) and filtered through a 0.45 μm PTFE membrane directly into methanol (200 mL). The purified polymer was dried in vacuo at 120° C. overnight and further at 250° C. for 2 hr to yield 1.60 g (87%). Anal. Calcd. for $C_{52}H_{30}F_6N_3O_6S_{0.5}$: C, 67.68%; H, 3.28%; N, 4.55%; S, 1.74%. Found: C, 67.56%; H, 3.31%; N, 4.29%; S, 1.68%.

Example 17

GPC and Viscosity Characterization Data

The molecular weights (MW) of the resulting polyimides were characterized by size-exclusion chromatography (GPC) in THF against polystyrene standards, and intrinsic viscosity measurement in N-methylpyrrolidione (NMP). The number-averaged MW ($M_n$) values vary between 99-40 kDa with PDIs ranging from 1.87 to 2.36. These molecular weights correspond to degrees of polymerization (DP) in the 35-to-141 range, and all of these polymers did form tough, creasable, and optically-transparent films from chloroform or DMAc solutions. It is clear that as the content of chromophore is increased, the molecular weight decreases. This is most likely due to mass imbalance as the two-photon co-monomer is an amorphous solid, which is very difficult to obtain in ultra-high purity necessary for exact reaction stoichiometry in the polycondensation reaction. The intrinsic viscosity values range from 1.31-0.70 dL/g, and are consistent with the GPC results.

TABLE 1

Intrinsic Viscosity and Molecular Weight Data

| Polymer | $Mw^a$ (kDa) | $Mn^a$ (kDa) | $PDI^a$ | DP | $[\eta]^b$ (dL/g) |
|---|---|---|---|---|---|
| 3a | 222 | 88 | 2.48 | 126 | 1.31 |
| 3b | 212 | 90 | 2.36 | 121 | 1.14 |
| 3c | 121 | 54 | 2.24 | 65 | 0.91 |
| 3d | 94 | 47 | 1.98 | 51 | 0.77 |
| 3e | 75 | 40 | 1.87 | 35 | 0.70 |

Example 18

Thermal Characterization & Elemental Analysis Data

The thermal properties and thermo-oxidative stability were characterized by differential scanning calorimetry (DSC) and thermogravimetric analysis (TGA) in both nitrogen atmosphere and circulating air, and the glass transition ($T_g$) and decomposition temperatures are summarized in Table 2. The $T_g$ increased from 208° C. to 241° C. as the mole percentage of AF-240 increased from 0 to 100% in the polymer compositions. As would have been expected, the bulky dye units extending from the polymer backbone make long-range molecular motion more difficult, and therefore, increase the $T_g$. These polymers are exceptionally thermo- and thermo-oxidatively stable, as the decomposition temperatures (5% weight loss; $T_{d5\%}$) of all polymers are above 500° C. in both air and inert conditions.

TABLE 2

Elemental Analysis and Thermal Properties for 6a-e.

| Polymer | Mol formula (mol wt) | | Elemental Analyses | | | | $Tg^a$ (° C.) | Td (5%)$^b$ $N_2$/air (° C.) |
|---|---|---|---|---|---|---|---|---|
| | | | C | H | N | S | | |
| 3a | $C_{37}H_{18}F_6N_2O_6$ | Calc | 63.44 | 2.59 | 4.00 | N/A | 208 | 527 |
| | 700.57 | Found | 63.12 | 2.74 | 3.87 | | | 516 |
| 3b | $C_{40}H_{20.4}F_6N_{2.2}O_6S_{0.1}$ | Calc | 64.49 | 2.76 | 4.14 | 0.43 | 211 | 522 |
| | 745.03 | Found | 64.38 | 2.80 | 3.94 | 0.60 | | 500 |
| 3c | $C_{46}H_{25.2}F_6N_{2.6}O_6S_{0.3}$ | Calc | 66.25 | 3.05 | 4.37 | 1.15 | 217 | 513 |
| | 833.95 | Found | 65.85 | 3.19 | 4.22 | 1.19 | | 502 |
| 3d | $C_{52}H_{30}F_6N_3O_6S_{0.5}$ | Calc | 67.68 | 3.28 | 4.55 | 1.74 | 223 | 506 |
| | 922.87 | Found | 67.56 | 3.31 | 4.29 | 1.68 | | 498 |
| 3e | $C_{67}H_{42}F_6N_4O_6S$ | Calc | 70.27 | 3.70 | 4.89 | 2.80 | 241 | 500 |
| | 1145.17 | Found | 70.48 | 3.89 | 4.74 | 2.80 | | 500 |

$^a$Inflection point in baseline of DSC at heating rate of 10° C./min in $N_2$.
$^b$Decomposition temperature at 5% wt loss from TGA (10° C./min) in $N_2$ and air.

Example 19

Poly(amide) with 100 mol % 2PA segment

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 1.4348 g, 1.95 mmol), and the vial was sealed with a Teflon-coated septum cap. Anhydrous DMAc (6 mL) was added by syringe to give a fluorescent solution. To the vial was charged isophthaloyl chloride (0.3953 g, 1.95 mmol) under a stream of argon, and the vial was sealed under argon and cooled to 5-10° C. in an ice bath. After 1.5 hr, the extremely viscous solution was precipitated into 50/50 methanol/water, which trapped DMAc in the yellow-orange fibrous solid. After grinding in a mortar and pestle, the solid was Soxhlet extracted with water for 48 hr and dried at 180° C. overnight at 0.4 torr. The purified polymer was dried in vacuo at 180° C. overnight and 0.4 torr to yield 1.44 g (85%). $^1$H NMR (400 MHz, DMSO-$d_6$) δ 10.35 (s, 2H), 8.45 (s, 1H), 8.1-7.7 (m, 12H) 7.58 (br. s, 1H), 7.47 (br. s, 1H), 7.38 (br. s), 7.25 (br. s, 2H), 7.16 (br. s, 2H), 7.0 (m, 5H), 6.77 (m, 2H), 6.61 (s, 4H), 2.08-1.80 (m, 4H), 0.18 (br. s, 6H); Anal. Calcd. for $C_{56}H_{42}N_4O_4S$: C, 77.58%; H, 4.88%; N, 6.46%; S, 3.70%. Found: C, 76.86%; H, 4.78%; N, 6.27%; S, 3.93%.

Example 20

Poly(amide-imide) with 100 mol % 2PA segment

To a 25 mL flame-dried vial equipped with a magnetic stir bar was added N,N-di[3-(4-aminophenoxy)phenyl]-7-(benzothiazol-2-yl)-9,9-diethyl-fluoren-2-amine (Example 8; 1.4738 g, 2.00 mmol), and the vial was sealed with a Teflon-coated septum cap. Anhydrous DMAc (15 mL) was added by syringe to give a fluorescent solution. To the vial was charged trimellitic anhydride chloride (0.4162 g, 1.94 mmol) under a stream of argon, and the vial was sealed under argon. After 40 hr, acetic anhydride (0.75 mL) and pyridine (0.65 mL) were added, and the mixture was stirred for 24 hr. The viscous solution was precipitated into 50/50 methanol/water (200 mL), and the yellow, fibrous solid was filtered and dried at 120° C. overnight in a vacuum oven. The solid was dissolved in chloroform (25 mL) and filtered through a 0.45 μm PTFE membrane directly into methanol (200 mL). The purified polymer was dried in vacuo at 120° C. overnight and further at 250° C. for 2 hr to yield 1.99 g (87%). $^1$H NMR (400 MHz, CDCl$_3$) δ 9.20 (m, 1H) 8.40-6.50 (m, 29H), 2.2-1.70 (m, 4H), 0.40 (br. s, 6H); Anal. Calcd. for C$_{57}$H$_{40}$N$_4$O$_5$S: C, 76.66%; H, 4.51%; N, 6.27%; S, 3.59%. Found: C, 75.95%; H, 4.34%; N, 6.13%; S, 3.79%.

Having thus described exemplary embodiments of the present invention, it should be noted by those skilled in the art that the disclosures herein are exemplary only and that alternatives, adaptations and modifications may be made within the scope of the present invention.

We claim:

1. Two-photon active polyimide compositions with the following formula:

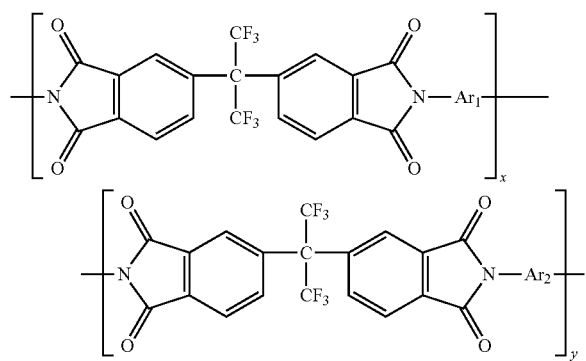

Ar$_1$ =

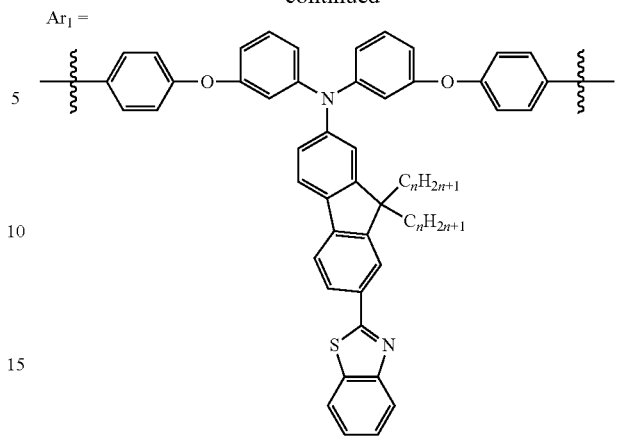

Ar$_2$ =

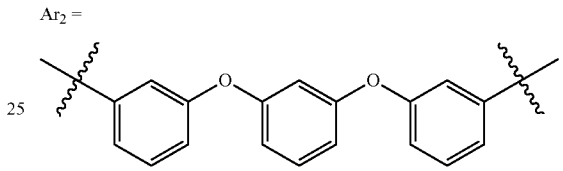

wherein x=from about 0.01 to about 1.0; and y=1.00−x; and C$_n$H$_{2n+1}$ is a straight alkyl chain, wherein n is 2.

* * * * *